C. W. KINSMAN.
COMBINED DRIVING AND BRAKING DEVICE FOR VEHICLES.
APPLICATION FILED JULY 19, 1917.
1,285,736.
Patented Nov. 26, 1918.
2 SHEETS—SHEET 1.
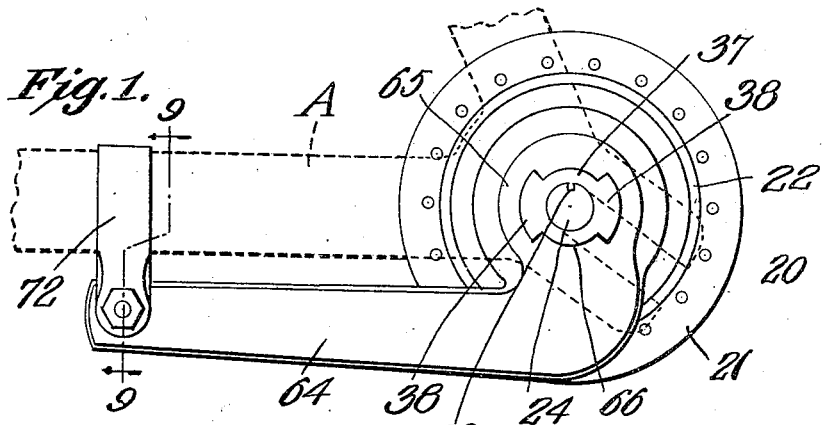
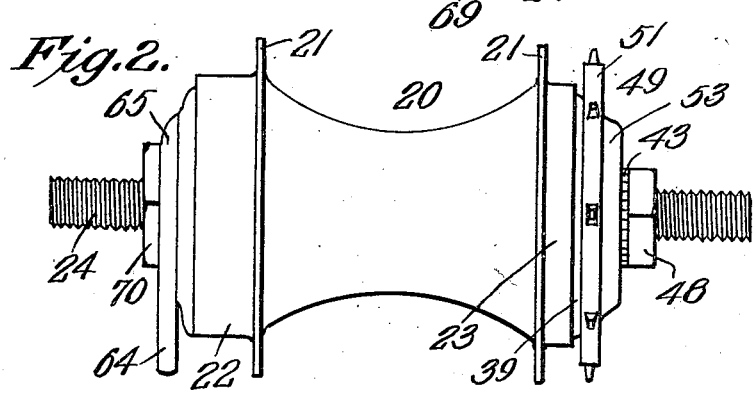
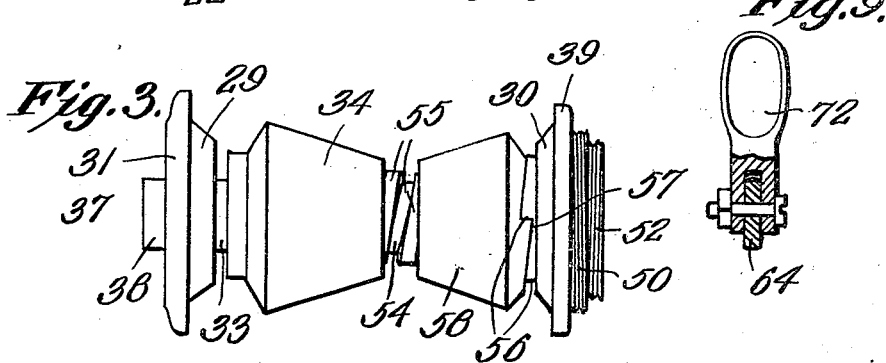
WITNESSES
James F. Crown
A. P. Hollingsworth
INVENTOR
Clarence W. Kinsman,
BY Richard B. Owen,
ATTORNEY

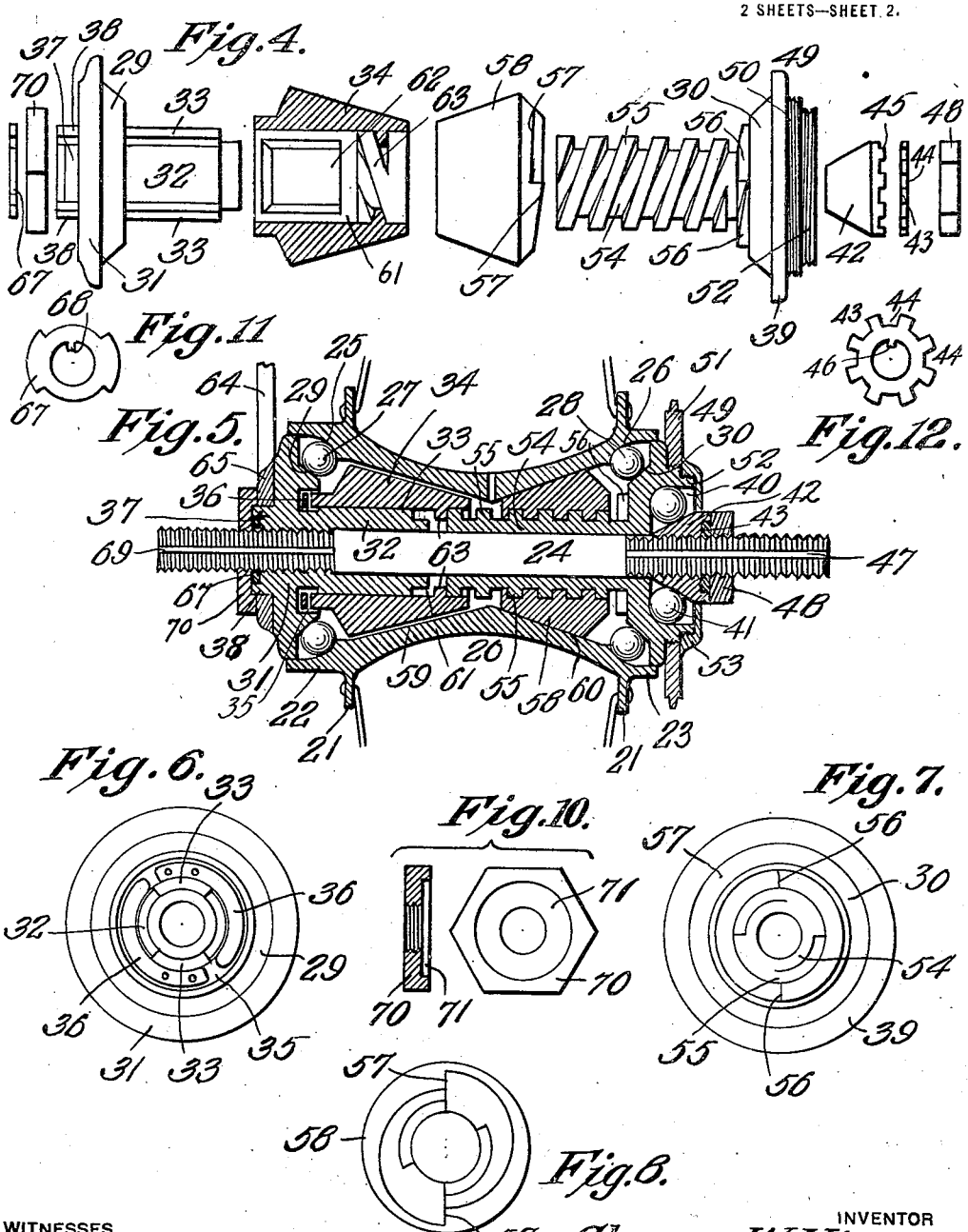

UNITED STATES PATENT OFFICE.

CLARENCE W. KINSMAN, OF NEW YORK, N. Y.

COMBINED DRIVING AND BRAKING DEVICE FOR VEHICLES.

1,285,736.      Specification of Letters Patent.      Patented Nov. 26, 1918.

Application filed July 19, 1917. Serial No. 181,632.

*To all whom it may concern:*

Be it known that I, CLARENCE W. KINSMAN, a citizen of the United States, residing at New York, in the county of Bronx and State of New York, have invented certain new and useful Improvements in Combined Driving and Braking Devices for Vehicles, of which the following is a specification.

This invention relates to combined driving and braking devices for vehicles, and particularly to what are known as coaster-brakes for bicycles, motorcycles and vehicles having driving means which may be released or reversed at the will of the operator.

The primary object of the invention is to provide in coaster-brake devices, means which shall be simple in their construction, of few parts and which will operate automatically to cause a firm and non-slipping connection between the driving means and the object to be driven when said driving means is rotated in one direction and when rotation of the driver has been stopped to disconnect it from the driven member, and finally, upon reverse rotation of the driving member, to check the rotation of the driven member by a suitable brake device.

Another object of the invention is to provide a vehicle wheel hub with suitable driving means therefor adapted to operate a cone clutch for engaging and disengaging the hub of the vehicle and also to engage a cone brake, said cones being separately operable by the driving mechanism when rotated in opposite directions.

A further object of the invention is to provide a coaster-brake for bicycles and other vehicles to which it may be applied, with a driving mechanism having a threaded sleeve projecting from one side thereof in permanent rotatable engagement with a clutch member and coöperating with the wheel hub to rotate the latter when said driving mechanism is rotated in one direction, and optionally engageable with a brake member to check the rotation of the wheel when said driving mechanism is turned in the reverse direction.

With the above as the principal objects in view, the invention consists in the novel construction, combination and arrangement of parts hereinafter described, pointed out in the appended claims and illustrated in the accompanying drawings, in which, Figure 1 is an elevation of the coaster brake mechanism as seen from the left side, its connection to a bicycle frame being shown in dotted lines, Fig. 2 is a rear elevation of a wheel hub of the bicycle type with the improved coaster brake applied thereto, Fig. 3 is an elevation showing the driving member, the clutch cone and the brake cone removed from the wheel hub, Fig. 4 is a similar view of the various parts of the coaster brake disassembled, the brake cone being shown in section, Fig. 5 is a central longitudinal sectional view of a wheel hub having the coaster brake applied thereto, Fig. 6 is an inside face view of the cone bearing at the left of the wheel hub, Fig. 7 is a similar view of the driving member, Fig. 8 is an end view of the driving clutch cone that coöperatively engages, at certain times, with the driving member, Fig. 9 is a sectional view on the line 9—9 of Fig. 1, Fig. 10 shows a face view and a cross sectional view of one of the locking nuts for holding the bearing cone at the left of the hub in adjusted position, Fig. 11 is a face view of a washer for preventing rotation of the left bearing cone, and Fig. 12 is a similar view of a locking washer for adjusting the small cone of the antifriction bearing.

In the drawing 20 indicates a hub of a bicycle, automobile or motorcycle wheel or other wheel of similar type having, as usual, the spoke flanges 21 and concentric bearing cups 22 and 23. The hub 20 with its flanges and cups rotates concentrically about an axle 24 threaded at each end for nuts (not shown) which secure the axle in a frame A or other relatively fixed support. In the cups 22 and 23 are ball seats 25 and 26, respectively, for anti-friction bearing members 27 and 28 which rotate in engagement with the cone surfaces 29 and 30, the former of which surfaces, projects from the inner side of a disk 31, the periphery of which fits closely but rotatably within the cup 22. The disk 31 is threaded on the axle 24 and has a sleeve 32 projecting inwardly, on opposite sides of which sleeve are locking lugs 33 for engaging a conical brake member 34 to hold the latter against rotation. Between the sleeve 32 and the inner surface of the cone 29 is formed an annular groove 35 for the reception of two or more flat arcuate spring members 36 screwed or riveted each at one end on the bottom of the groove 35 while the other free end stands normally above the bottom of the groove. The other side of the disk 31 has a short collar 37 of substantially the same diameter as the sleeve 32 and projecting in line therewith, said collar having diametrically disposed lugs 38 in line with the lugs 33 for a purpose to be described later.

The cone bearing 30 for the antifriction ball members 28 at the opposite end of the hub is mounted on and projects inwardly from a ball cup 39 forming a part of the driving device, said ball cup having an outwardly facing seat 40 for antifriction bearing balls 41 which are held in place by an adjustable cone 42 threaded on the axle 24 and held against rotation by a washer 43 having spaced peripheral notches 44 that engage crown teeth or lugs 45 on the outer face of the cone 42. A tooth 46 projects inwardly from the axle opening in said washer and is slidable in a longitudinal slot 47 in the axle 24. A nut 48 threaded on the end of the axle and bearing on the washer 43 serves to tighten and lock the cone 42. The ball cup 39 which forms a part of the driving member 49 has a concentric shoulder 50 on its outer side threaded and provided with a right-hand thread upon which is screwed a sprocket wheel or pinion 51. A slightly smaller shoulder 52 projects from the shoulder 50 and is fitted with a left-hand thread on which a cap 53 is screwed to prevent access of dust to the antifriction ball members 41.

From the inner face of the cone 30 and integral with the ball cup 39 and forming a part of the driving device, is a long sleeve 54 that rotates freely around the axle 24 and extends beyond the center of the hub in close relation to the sleeve 32 on the disk 31. The sleeve 54 has a double thread 55 on its outer surface extending from end to end of the sleeve, the threads preferably being square. Projecting from the inner face of the cone 30 toward the threads 55 is a clutch member comprising, as shown, two or more diametrically disposed ratchet teeth 56. The clutch teeth 56 are designed, at certain times, to engage similar teeth 57 on the outer end of a clutch cone 58 mounted on and engaging the threads 55 of the sleeve 54 and when so engaged the clutch cone 58 rotates in unison with the driving device.

The interior of the hub 20 is divergently tapered from the center toward the ball seats 25 and 26 at the respective ends, the outer end of said tapered portions 59 and 60 being of greater diameter than at the center of the hub. The inclined portions 59 and 60 of the hub 20 have the same angle as the respective cones 34 and 58, so that the former cone when brought into engagement with the surface 59 will check the rotation of the hub while the latter cone 58 will cause rotation of the hub when brought into frictional engagement therewith.

The brake cone 34 is mounted to slide longitudinally on the sleeve 32, the bore 61 of which has a diameter equal to the outer diameter of the threads 55 and the arcuate surfaces of the lugs 33 on the sleeve 32. Lugs 62 are formed within the bore to be engaged by the lugs 33 and prevent rotation of the brake cone while permitting it to move in an axial direction. The inner end of the bore 61 of the cone 34 is provided with a few turns of a double screw thread 63 adapted, under certain conditions, to be engaged by the double threads 55 on the sleeve 54 and move the cone end-wise on the sleeve 32 into and out of engagement with the cone seat 59 in the hub. The threads 63 extend a short distance back from the inner end of the cone 34 to provide a bearing in said cone for the end of the threaded stem 54, the threads 55 of which extend to the extreme end and rotate against the ends of the threads 63, as shown in Fig. 5. The brake cone 34 is held at all times with the threads 63 in engagement with, or in position to be engaged by the threads 55 through the pressure of the springs 36 heretofore described, the ends of which springs bear upon the outer end of the cone 34 to force the same at all times, toward the center of the hub. The sleeve 37 on the outer face of the bearing disk 31 at the left side of the hub is prevented from turning by a horizontally disposed arm 64 having a circularly-shaped upwardly projecting rear end 65 formed with an opening 66 therein, of a shape to fit over the sleeve 37 and its lugs 38, as shown in Fig. 1, said lugs 38 projecting a short distance beyond the end of the sleeve to form a seat for a thin washer 67 of similar shape to the opening 66 and having a tooth 68 to engage a longitudinal groove 69 in the end of the shaft 24. A lock nut 70 having a circular depression 71 in its inner side, of a diameter equal to the diameter of lugs 38 and washer 67, is screwed on the axle 24 and over said lugs and washer to lock these parts upon the axle. Movement of the arm 64 is prevented during the rotation of the hub by a stirrup 72 connected to the forward end of said arm and to the frame of the vehicle.

A coaster brake constructed as described is operated in the following manner:

When at rest, the cone 58 will be disconnected from its coöperating conical surface 60, having been carried by the threads 55 outwardly, the teeth 57 on said cone engaging with the teeth 56 on the driving means 49. Forward movement of the driving means will cause the sleeve 54 and the threads to be rotated within the cone and the latter forced by said threads toward the center of the hub, and into engagement with its conical surface 60, gripping said hub with sufficient force to cause rotation thereof. So long as the driving means moves in the forward direction, the cone 58 will be held by the threads 55 in clutching engagement with the hub and cause rotation of the hub, but when upon stopping or slowing down the driving means, the sleeve 54 and threads 55 will also be held stationary or driven with less speed, and because of the more rapid movement of the cone 58, the latter will be moved endwise away from the center of the hub and cause its disengagement with the hub. Forward movement of the driving mechanism will again force the cone 58 into engagement with the hub.

If, however, the driving mechanism be reversed after stopping the same, the cone 58 will, as described, first be disengaged from the hub 20; the ends of the threads 55 rotating within the non-rotatable cone 34, will engage the threads 63 therein, and drawing the cone 34 upon the sleeve 32, endwise against the conical surface 59 within the hub, check the rotation of said hub. The degree of pressure exercised by the cone 34 will be determined by the amount of rotation of the driving mechanism in reversed direction. Movement of the driving means in a forward direction will first back the cone 34 away from its coöperating conical seat 59 in the hub and then force the cone 58 into driving engagement with the interior cone 60. It is to be understood that the backward or outward movement of the brake cone 34 will place the springs 36 under tension whereby the latter holds the threads 63 of the cone constantly in contact with the thread 55 on the sleeve 54.

I claim:

1. In a device of the kind described comprising a hub having a conical seat in each end, a fixed axle for said hub, driving means at one end of said hub and rotatable freely about said axle, said driving means including a bearing cone for the hub and an inwardly projecting sleeve, a clutch cone in one end of said hub rotatable on said sleeve, a bearing cone for the opposite end of the hub threaded on the axle and having an inwardly extending sleeve with longitudinal flanges, a brake cone in the opposite end of the hub slidable longitudinally on said flanged sleeve and held thereby against rotation, a continuous thread extending from end to end of the driving sleeve in engagement at all times with the clutch cone and optionally engageable with the brake cone, and springs pressing against the outer end of the brake cone to hold it against the end of said threaded sleeve in position to be engaged by said thread.

2. A device of the kind described comprising a hub having an outwardly flaring conical seat at each end, a driving cone at one end of said hub, a brake cone in the other end of said hub, both of said cones being movable axially into and out of direct positive engagement with the hub, a non-rotatable axle having threaded ends and a longitudinal groove in each end, a bearing cone threaded on one end of said axle having a flanged sleeve projecting into the brake cone to prevent rotation thereof but permit sliding movement, said flanged sleeve extending a short distance beyond the outer side of said bearing cone, the flanges of which project beyond the sleeve, a washer slidable on the end of the axle and having a finger to engage the groove therein to prevent rotation, said washer fitting between the projecting flanges of said sleeve on the bearing cone to prevent rotation thereof, locking means to hold the washer in place, driving means at the opposite end of the hub and a threaded projection extending inwardly through the driving cone and adapted to operate said cone in a longitudinal direction, and a thread in the inner end of the brake cone optionally engageable with said extension thread.

3. A device of the kind described comprising a wheel hub, a fixed axle about which said hub is adapted to rotate, antifriction bearings supporting the ends of the rotatable hub, including a cone forming a part of each of said bearings threaded on each end of the axle, said cones having notches in their outerside, a washer slidable on each threaded end of the axle and having a tooth projecting into a longitudinal groove in said axle to prevent rotation of the washer, fingers projecting outwardly from both said washers for engaging the notches on said cones to prevent them turning and means threaded on both ends of the axle to lock the washers and cones to the axle.

4. A device of the kind described comprising a wheel hub, a fixed axle about which said hub is adapted to rotate, antifriction bearings between the hub and the axle, including a cone threaded on each end of said axle forming a part of said anti-friction bearing and having notches in its outer side, and a washer having outwardly projecting radial fingers and an inwardly projecting tooth adapted to slide endwise on each end of said axle, the tooth of each washer being movable in a groove in the axle to prevent rotation on the axle, the washers in turn engaging the notches in the outer faces of the bearing cones and holding the cones against rotation.

In testimony whereof I affix my signature in presence of two witnesses.

CLARENCE W. KINSMAN.

Witnesses:
BERTHA R. SMITH,
H. H. KINSMAN.